3,163,513
METHOD OF MAKING A SEMICRYSTALLINE CERAMIC BODY

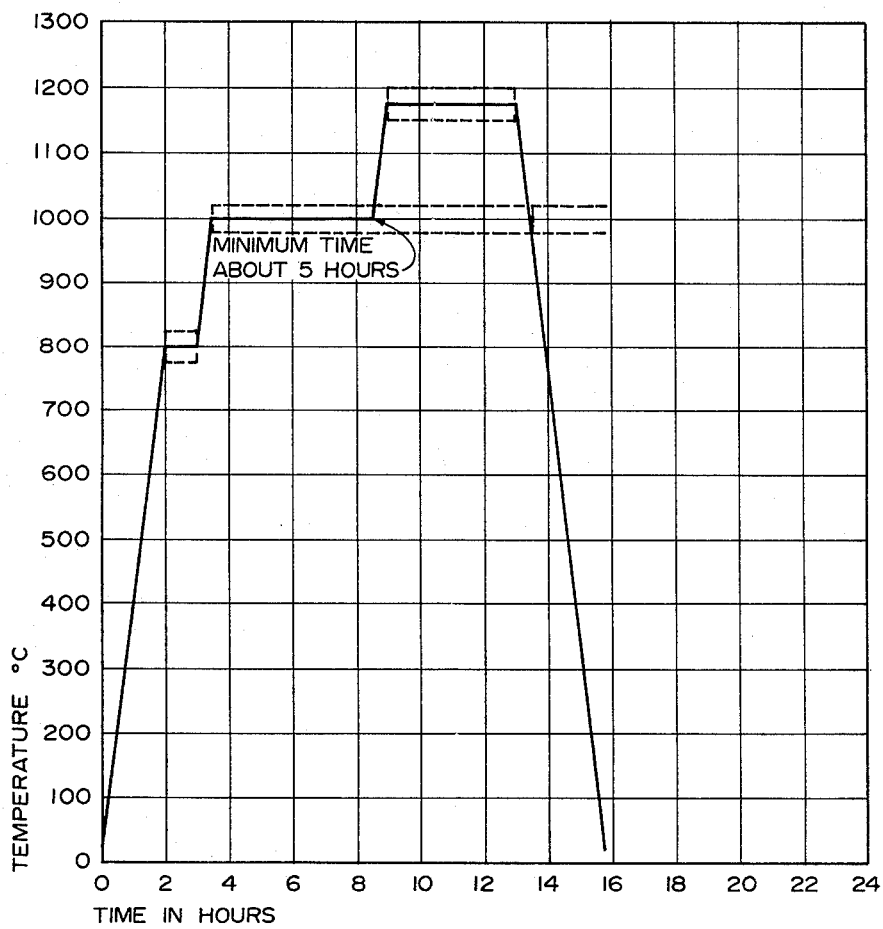

Donald N. Brown, Corning, N.Y., assignor to Corning Glass Works, Corning, N.Y., a corporation of New York
Filed Oct. 17, 1962, Ser. No. 231,298
4 Claims. (Cl. 65—33)

This invention relates to the production of semicrystalline ceramic bodies by the controlled crystallization of glass bodies by heat treatment and particularly to a novel method of making a semicrystalline body, without substantially deforming it, while providing it with an extremely low thermal expansion coefficient and a relatively high modulus of rupture (sometimes called flexural strength), from a glass body comprising primarily $SiO_2$, $Li_2O$, $Al_2O_3$, and $TiO_2$, and containing up to 5% of other compatible oxides, the $TiO_2$ functioning to promote crystallization.

Glass bodies having such compositions may be converted by suitable heat treatments to semicrystalline bodies which are characterized in general by higher moduli of rupture, higher deformation temperatures and lower linear thermal expansion coefficients than those of the original glass bodies, as is shown in the copending United States application of Stanley D. Stookey, Serial No. 718,398, filed March 3, 1958. Substantial variations in composition and/or heat treatment cause substantial variations in the moduli of rupture, expansion coefficients and amount of deformation of the semicrystalline products and it is sometimes necessary to compromise and accept less than the optimum value of one or more properties in order to obtain a desired optimum value of another property. Thus, United States Patent No. 2,960,801 discloses the discovery that bodies, consisting essentially of about 71% $SiO_2$, 2.5% $Li_2O$, 18% $Al_2O_3$, 4.5% $TiO_2$, 3% MgO and 1% ZnO plus minor constituents, can be made with high average modulus of rupture, when abraded, of at least 21,000 p.s.i. together with a low linear thermal expansion coefficient of about $10 \times 10^{-7}$ per ° C. or slightly lower between 0° and 300° C., but also with an amount of distortion too great for purposes requiring small or close tolerance of dimensions. For those instances where these bodies with excessive distortion cannot be used, e.g., where the bodies cannot be properly supported or where subsequent grinding or refinishing of the bodies is physically or economically impractical, it has been necessary to resort to a different heat treatment. Thus, United States Patent No. 2,960,802 discloses a method discovered that will cause very little distortion in producing bodies having a relatively low linear thermal expansion of 10 to $15 \times 10^{-7}$ per ° C. between 0° and 300° C., but with a somewhat reduced minimum average modulus of rupture of 13,000 p.s.i.

It is an object of this invention to provide a method whereby semicrystalline bodies are made with optimized values of all three of the above-mentioned properties, viz., modulus of rupture, thermal expansion coefficient and amount of deformation.

It is a more specific object of this invention to provide a method of producing semicrystalline bodies having extremely low linear thermal expansion coefficients (i.e. not exceeding about $6 \times 10^{-7}$ per ° C. between 25° and 300° C.) and relatively high average moduli of rupture of at least 19,000 p.s.i., but without any substantial deformation of the bodies.

An understanding of the inventive method will be facilitated by reference to the accompanying drawing wherein the sole figure is a time-temperature plot of the broad and preferred time-temperature sequences with the changes in temperature level plotted at one exemplary permissible rate of approximately 7° C. per minute for simplicity of illustration.

Specifically, the method comprises heat treating a glass body consisting essentially of about 71% $SiO_2$, 2.5% $Li_2O$, 18% $Al_2O_3$, 4.5% $TiO_2$, 3% MgO and 1% ZnO, plus minor constitutents as explained below, by heating it at a rate of not over about 7° C. per minute to about 800° C., holding it at about 800° C. for about one hour, further heating it at a rate not over about 7° C. per minute to 980°–1020° C. and holding it in such temperature range for at least about 5 hours, then further heating it at a rate not over about 7° C. per minute to 1150°–1200° C. and holding it in such latter temperature range for about 4 hours.

The above-mentioned composition was melted in a continuous tank furnace at about 1600° C. In order to maintain oxidizing conditions in the tank during melting, small amounts of $NaNO_3$ and $As_2O_3$ were included in the batch as oxidizing agents, the $As_2O_3$ also functioning as a fining agent. Other conventional oxidizing and fining agents can be substituted, if desired. The residual $Na_2O$ and $As_2O_3$ remaining in the glass amount to about 1.5% of the total composition and have no appreciable effect on the major properties of either the glass or its semicrystalline product. For convenience and facilitation of expression, therefore, the composition is expressed in round figures by omitting such minor constituents and rounding off the remaining constituents as is indicated above.

The modulus of rupture preferably is measured in the conventional manner by supporting individual rods of the semicrystalline product about ¼-inch in diameter and 4 inches long on two knife edges spaced 3½ inches apart and loading them on two downwardly acting knife edges about ¾-inch apart and centrally spaced from the lower knife edges until breakage of the rods occurs. To ensure comparable results, the rods are first abraded by being rolled in a ball mill for 15 minutes with 30 grit silicon carbide. Two or more rods are thus tested to obtain the average value which is calculated in p.s.i. Abraded rods of glass in general, when treated and measured in this manner, show moduli of rupture ranging from 5000 to 6000 p.s.i.

The method of measuring the linear thermal expansion coefficient of glasses and semicrystalline ceramics is so well known as to require no discussion here. The measured average expansion coefficient of the above-described glass composition in the vitreous state is about $34 \times 10^{-7}$ per ° C. between 0° and 300° C.

In comparison with the above values for the modulus of rupture and the expansion coefficient of the glass, the stated heat treatment of the above-described glass will produce semicrystalline bodies having an average modulus of rupture of at least 19,000 p.s.i. and an average expansion coefficient of 0 to $6 \times 10^{-7}$ per ° C. between 25° and 300° C.

The amount of deformation which will be produced by a specific heat treatment schedule during conversion of a body of the above-described glass to a semicrystalline body is most readily measured by using rods of the glass ¼-inch in diameter and 5 inches long and subjecting them to said schedule while they are mounted on refractory supports spaced 4 inches apart. Measurement of the bow or sag of the rod between the supports as a result of the heat treatment is made by means of a gauge consisting of a pair of knife edges 4 inches apart and a dial gauge with a knife edge tip mounted midway between and below the pair of knife edges. The sagged rod is placed on the knife edges of the gauge convex side down, the knife edges contacting as closely as possible the points which were in contact with the refractory supports during the heat treatment. The deflection of the mid-point of the convex side of the rod from the plane of the two knife edges of the gauge is indicated on the dial in mils or mm. Deformation values of bodies made in accordance with this invention and measured as described above do not exceed about 6.5 mm. and can be kept as low as about 5.0 mm. or lower. In contrast, bodies made according to the teaching of U.S. Patent 2,960,801 invariably have deformation values, measured as described above, of at least about 10.0 mm. and commonly are as high as 15 mm. or higher.

The use of a preliminary holding temperature or range is essential for the proper initiation of crystallization. It is believed that in such temperature range sub-microscopic crystallites or nuclei segregate throughout the glass and slowly increase in size with time and temperature and that such nuclei constitute the beginning of the formation of an interlocked crystalline structure or network of high melting point which ultimately will support the body and minimize its deformation as the temperature is further increased.

I have discovered that, in order to convert a glass body of the above-described composition to a semicrystalline body of high modulus of rupture and extremely low linear thermal expansion coefficient without substantial deformation, the preliminary holding temperature is approximately 800° C. I have also found that the most effective holding time for the present purpose is about one hour. Holding for a substantial time at a temperature substantially above or below 800° C. (e.g., in excess of ±25° C. variation) tends to lower the modulus of rupture and increase the thermal expansion coefficient and deformation.

The conversion of the glass body to the desired semicrystalline state is far from complete at this stage and further heating and holding at the aforementioned higher temperature is required. First it is necessary to further heat the body to a temperature in a range of 980° to 1020° C., preferably to about 1000° C. for 5 to 10 hours. Using temperatures substantially higher or lower than this range causes a substantial increase in deformation. Holding times of substantially less than 5 hours also result in greater deformation.

Lastly, it is necessary to complete the conversion by further heating the body to 1150°–1200° C. and holding it in this temperature range for about 4 hours. Temperatures of at least 1150° C. are necessary for developing the high modulus of rupture. On the other end of the range, temperatures in excess of 1200° C. results in undesirably higher deformation. Preferably, temperatures in the range of 1175° to 1190° C. are used, with 1175° giving excellent results.

The rate at which the temperature is raised up to the preliminary holding and the subsequent holding ranges can have a substantial effect on the properties of the semicrystalline product and a rate of about 7° C. per minute appears to be approximately the maximum permissible rate without causing substantial deterioration in the properties, e.g. modulus of rupture and deformation. It is usually preferable to use a rate of about 5° C. per minute for optimum property values.

Cooling the semicrystalline product slowly (e.g., 1°–2° C. per minute) tends to raise its expansion coefficient and increase the amount of deformation. A rate of 5° C. or 7° C. per minute is satisfactory. Higher cooling rates are also satisfactory, being limited only by the thermal shock resistance of the kiln refractories, and the semicrystalline product can even be removed from the kiln and cooled in air.

What is claimed is:

1. The method of heat treating a glass body consisting essentially of about 71% $SiO_2$, 2.5% $Li_2O$, 18% $Al_2O_3$, 4.5% $TiO_2$, 3% MgO and 1% ZnO by weight to convert it without substantial change of size and shape to a semicrystalline body having an average modulus of rupture, when abraded, of at least 19,000 p.s.i. and an extremely low linear thermal expansion coefficient, which comprises heating the glass body at a rate not over about 7° C. per minute to about 800° C., holding it at such temperature for about one hour, further heating it at a rate of not over about 7° C. per minute to 980°–1020– C. and holding it in such temperature range for at least about 5 hours, still further heating it at a rate of not over about 7° C. per minute to 1150°–1200° C. and holding it in such temperature range for about 4 hours, and thereafter cooling the body.

2. The method of heat treating a glass body consisting essentially of about 71% $SiO_2$, 2.5% $Li_2O$, 18% $Al_2O_3$, 4.5% $TiO_2$, 3% MgO and 1% ZnO by weight to convert it without substantial change of size and shape to a semicrystalline body having an average modulus of rupture, when abraded, of at least 19,000 p.s.i. and an extremely low linear thermal expansion coefficient, which comprises heating the glass body at a rate not over about 7° C. per minute to about 800° C., holding it at such temperature for about one hour, further heating it at a rate of not over about 7° C. per minute to 980–1020– C. and holding it in such temperature range for 5 to 10 hours, still further heating it at a rate of not over about 7° C. per minute to 1175°–1190– C. and holding it in such temperature range for about 4 hours, and thereafter cooling the body.

3. The method of heat treating a glass body consisting essentially of about 71% $SiO_2$, 2.5% $Li_2O$, 18% $Al_2O_3$, 4.5% $TiO_2$, 3% MgO and 1% ZnO by weight to convert it without substantial change of size and shape to a semicrystalline body having an average modulus of rupture, when abraded, of at least 19,000 p.s.i. and a linear thermal expansion coefficient not exceeding about $6 \times 10^{-7}$ per ° C. between 25° and 300° C., which comprises heating the body at a rate not over about 7° C. per minute to about 800° C., holding it as such temperature for about one hour, further heating it at a rate of not over about 7° C. per minute to about 1000° C. and holding it at such temperature for at least about 5 hours, still further heating it at a rate of not over about 5° C. per minute to about 1175° C. and holding it in such temperature range for about 4 hours, and thereafter cooling the body.

4. The method of claim 3 in which the body is held at about 1000° C. for not more than about 10 hours and in which the body is still further heated to about 1175° C. at a rate of about 1° C. per minute.

References Cited in the file of this patent
UNITED STATES PATENTS
2,960,802    Voss _____ Nov. 22, 1960